(12) United States Patent
Trindade de Sousa Monteiro

(10) Patent No.: US 11,068,973 B2
(45) Date of Patent: *Jul. 20, 2021

(54) METHOD AND SYSTEM FOR PERFORMING SALE ACTIONS OF AN AUCTION OR A SALE OFFER OF A PRODUCT OR SERVICE THROUGH A COMMUNICATION NETWORK

(71) Applicant: Luciano Trindade de Sousa Monteiro, Cidade Monções (BR)

(72) Inventor: Luciano Trindade de Sousa Monteiro, Cidade Monções (BR)

( * ) Notice: Subject to any disclaimer, the term of this patent is extended or adjusted under 35 U.S.C. 154(b) by 0 days.

This patent is subject to a terminal disclaimer.

(21) Appl. No.: 16/677,210

(22) Filed: Nov. 7, 2019

(65) Prior Publication Data

US 2020/0074536 A1 Mar. 5, 2020

Related U.S. Application Data

(63) Continuation-in-part of application No. 14/846,434, filed on Sep. 4, 2015, now Pat. No. 10,643,273.

(30) Foreign Application Priority Data

Apr. 27, 2015 (BR) .................... BR102015009454-0

(51) Int. Cl.
*G06Q 30/00* (2012.01)
*G06Q 30/08* (2012.01)
*G06Q 30/06* (2012.01)

(52) U.S. Cl.
CPC ......... *G06Q 30/08* (2013.01); *G06Q 30/0611* (2013.01); *G06Q 30/0635* (2013.01); *G06Q 30/0641* (2013.01)

(58) Field of Classification Search
CPC .............. G06Q 30/08; G06Q 30/0611; G06Q 30/0635; G06Q 30/0641; G06Q 30/064

(Continued)

(56) References Cited

U.S. PATENT DOCUMENTS 6,598,029 B1 7/2003 Johnson et al.
6,691,094 B1 2/2004 Herschkorn
(Continued)

OTHER PUBLICATIONS

Patent Agency Reviews Patent Application Approval Request for Fantasy Sport Auction Draft Application, Computer Weekly News, Oct. 31, 2013; Dialog #1444052977, 6pgs; 2013.

*Primary Examiner* — Robert M Pond
(74) *Attorney, Agent, or Firm* — BakerHostetler

(57) ABSTRACT

The present invention relates to a system and a method for performing sale actions of a product or service through a communication network (300) which comprises: sending to one seller (100) the specifications of the product or service with a reference price, so that the seller (100) can present one or more offers (10) to be put up for sale; receiving, from the seller (100), the offer (10) for of product or service to be put up for sale; storing the offer (10) in a database (310) of the communication network (300); receiving, from a plurality of buyers (200), a plurality of purchase proposals (20) for the product or service, the plurality of purchase proposals (20) being determined for the offer (10) of the seller (100); storing the plurality of purchase proposals (20) in the database (310) of the communication network (300); processing the plurality of purchase proposals (20) and determining a product or service matrix, the matrix being constituted by the plurality of purchase proposals (20) received for the offer (10); monitoring when the seller (100) takes a new lot (30) at his opportune moment or at the time limit, in the course of the auction, at the price of his interest to sell the product or service to the plurality of buyers (200) who has given the plurality of units corresponding to the purchase proposals (20) of the respective lot (30).

37 Claims, 13 Drawing Sheets

(58) Field of Classification Search
USPC .................................................. 705/26, 27
See application file for complete search history.

(56) References Cited

U.S. PATENT DOCUMENTS

| | | |
|---|---|---|
| 7,330,826 B1 | 2/2008 | Porat et al. |
| 2001/0042041 A1 | 11/2001 | Moshal et al. |
| 2007/0244797 A1 | 10/2007 | Hinson et al. |
| 2012/0265634 A1 | 10/2012 | Kinney |

| Reference Price - Maximum Purchase Proposal | 37 | 36 |
|---|---|---|
| Minimum Upset Price Proposal | 32 | |

Adjust after Bonus Algorithm $$(PRmin)+((1-B\%)*(PRL-PRmin))$$

For Purchase Proposal Minimum value = 32, Qt. 4, and Variations according to % Bonus.

| Ranges | 0% | 10% | 30% | 50% | 75% | 100% |
|---|---|---|---|---|---|---|
| 36 | 36 | 35.6 | 34.8 | 34.0 | 33 | 32 |
| 35 | 35 | 34.7 | 34.1 | 33.5 | 32.75 | 32 |
| 34 | 34 | 33.8 | 33.4 | 33 | 32.5 | 32 |
| 33 | 33 | 32.9 | 32.7 | 32.5 | 32.25 | 32 |
| 32 | 32 | 32 | 32 | 32 | 32 | 32 |
| 31 | | | | | | |
| 30 | | | | | | |

| $ Total Lot > | 135 | 134.3 | 132.9 | 131.5 | 129.75 | 128 |
| Average Price > | 33.75 | 33.575 | 33.225 | 32.875 | 32.437 | 32 |

Fig. 4

$$(PRmin)+((1-B\%)*(PRL-PRmin))$$

Reference price > 37.000,00
B% = 0%
Prmin
If lower purchase proposal

| PRL | 30.000,00 | 31.000,00 | 32.000,00 | 33.000,00 | 34.000,00 | 35.000,00 | 36.000,00 |
|---|---|---|---|---|---|---|---|
| 36.000,00 | 36.000,00 | 36.000,00 | 36.000,00 | 36.000,00 | 36.000,00 | 36.000,00 | 36.000,00 |
| 35.000,00 | 35.000,00 | 35.000,00 | 35.000,00 | 35.000,00 | 35.000,00 | 35.000,00 | |
| 34.000,00 | 34.000,00 | 34.000,00 | 34.000,00 | 34.000,00 | 34.000,00 | | |
| 33.000,00 | 33.000,00 | 33.000,00 | 33.000,00 | 33.000,00 | | | |
| 32.000,00 | 32.000,00 | 32.000,00 | 32.000,00 | | | | |
| 31.000,00 | 31.000,00 | 31.000,00 | | | | | |
| 30.000,00 | 30.000,00 | | | | | | |

$$(PRmin)+((1-B\%)*(PRL-PRmin))$$

Reference price > 37.000,00
B% = 20%
Prmin
If lower purchase proposal

| PRL | 30.000,00 | 31.000,00 | 32.000,00 | 33.000,00 | 34.000,00 | 35.000,00 | 36.000,00 |
|---|---|---|---|---|---|---|---|
| 36.000,00 | 34.800,00 | 35.000,00 | 35.200,00 | 35.400,00 | 35.600,00 | 35.800,00 | 36.000,00 |
| 35.000,00 | 34.000,00 | 34.200,00 | 34.400,00 | 34.600,00 | 34.800,00 | 35.000,00 | |
| 34.000,00 | 33.200,00 | 33.400,00 | 33.600,00 | 33.800,00 | 34.000,00 | | |
| 33.000,00 | 32.400,00 | 32.600,00 | 32.800,00 | 33.000,00 | | | |
| 32.000,00 | 31.600,00 | 31.800,00 | 32.000,00 | | | | |
| 31.000,00 | 30.800,00 | 31.000,00 | | | | | |
| 30.000,00 | 30.000,00 | | | | | | |

$$(PRmin)+((1-B\%)*(PRL-PRmin))$$

Reference price > 37.000,00
B% = 50%
Prmin
If lower purchase proposal

| PRL | 30.000,00 | 31.000,00 | 32.000,00 | 33.000,00 | 34.000,00 | 35.000,00 | 36.000,00 |
|---|---|---|---|---|---|---|---|
| 36.000,00 | 33.000,00 | 33.500,00 | 34.000,00 | 34.500,00 | 35.000,00 | 35.500,00 | 36.000,00 |
| 35.000,00 | 32.500,00 | 33.000,00 | 33.500,00 | 34.000,00 | 34.500,00 | 35.000,00 | |
| 34.000,00 | 32.000,00 | 32.500,00 | 33.000,00 | 33.500,00 | 34.000,00 | | |
| 33.000,00 | 31.500,00 | 32.000,00 | 32.500,00 | 33.000,00 | | | |
| 32.000,00 | 31.000,00 | 31.500,00 | 32.000,00 | | | | |
| 31.000,00 | 30.500,00 | 31.000,00 | | | | | |
| 30.000,00 | 30.000,00 | | | | | | |

$$(PRmin)+((1-B\%)*(PRL-PRmin))$$

Reference price > 37.000,00
B% = 100%
Prmin
If lower purchase proposal

| PRL | 30.000,00 | 31.000,00 | 32.000,00 | 33.000,00 | 34.000,00 | 35.000,00 | 36.000,00 |
|---|---|---|---|---|---|---|---|
| 36.000,00 | 30.000,00 | 31.000,00 | 32.000,00 | 33.000,00 | 34.000,00 | 35.000,00 | 36.000,00 |
| 35.000,00 | 30.000,00 | 31.000,00 | 32.000,00 | 33.000,00 | 34.000,00 | 35.000,00 | |
| 34.000,00 | 30.000,00 | 31.000,00 | 32.000,00 | 33.000,00 | 34.000,00 | | |
| 33.000,00 | 30.000,00 | 31.000,00 | 32.000,00 | 33.000,00 | | | |
| 32.000,00 | 30.000,00 | 31.000,00 | 32.000,00 | | | | |
| 31.000,00 | 30.000,00 | 31.000,00 | | | | | |
| 30.000,00 | 30.000,00 | | | | | | |

FIG 4A

METHOD AND SYSTEM FOR PERFORMING SALE ACTIONS OF AN AUCTION OR A SALE OFFER OF A PRODUCT OR SERVICE THROUGH A COMMUNICATION NETWORK

This application is a Continuation-in-Part of U.S. patent application Ser. No. 14/846,434 filed Sep. 4, 2015, which claims priority of the Brazilian patent application no. BR102015009454-0 filed on Apr. 27, 2015, the content(s) thereof being hereby wholly incorporated by reference.

The present invention relates to a system and a method for performing sale actions (e.g., actions of an auction or sale offer) for selling a product or service through a communication network. In an exemplary embodiment, the sale action may include an auction being controlled by a managing system that may be an internal or external provider, in which the managing system or the seller defines the product or service with specification and a reference price for the sale action (e.g., auction or offer) on the Internet. Potential buyers, after having been registered, can present bids on the products nominally or in price ranges defined by the administrator. The bids presented by the buyers can be received by the administrator and listed individually or accumulated by ranges in the database, and the product or service can be purchased in lots from a lowest price defined by the seller at the moment when he considers a lot to be attractive or, alternatively, at a pre-determined date and time. Additionally, related services that are complementary to the products may also be offered by the suppliers, such as financial services, insurance services, etc., also offered in lots, but being hired by buyers. These services may serve as an operation guarantee of a carried-out transaction.

DESCRIPTION OF THE PRIOR ART

An auction or sales promotion of products and services is widely used by both public and private companies, the objective of which is to promote, in a simple, rapid and more competitive manner, the sales of products or services.

Auctions that have their origin in the physical market are restricted to areas such as art pieces and some others due to the difficulty of grouping all the potential buyers for a broad offer and purchase in the transaction of goods and services. With the advent of the Internet, auctions have become popular, exactly because they can increase the number of potential sellers and buyers.

Promotions are very common to boost or promote sales in various ways, but mainly through the temporary reduction of predetermined and fixed prices. In these sales, the seller sells all products at a reduced price and has little control over the quantities sold.

The electronic auctions and sales offers on the Internet have been increasing around the world, allowing to market products and services that may be unfeasible to be marketed in common auctions. One may realize that such a characteristic results in much wider opportunities for sellers and buyers.

One may also realize that electronic auctions or sales offers made available on the Internet, and also the patents referring to this subject, are characterized by mere transpositions of concepts from the physical medium to the Internet or electronic medium.

One focus of the present invention relates to an auction with a single seller, but with a plurality of buyers, and may be applied for calculation of discounts in the purchase proposals.

The market to which the present invention relates consists of buyers and sellers. The price set up by the market represents, most of the time, especially in the trade market for goods and services, an average value assigned by said sellers and buyers, but the price that each individual would pay may be different from one person to another depending on certain conditions, such as his/her degree of interest in the good or service. Anyhow, one should note that known prior art auction techniques do not focus on individual interests as mentioned.

The present invention advantageously meets this focus so that each buyer may submit an offer to purchase the good or service at a price compatible with his/her degree of interest, that may or may not be accepted by the seller. Thus, the market price considers the individual and specific interests of each individual.

The present invention may be configured to calculate discounts in the purchase proposals by means of an algorithm, which may be fundamental for the practical feasibility of the present invention, since the purchase proposals may vary. In case said algorithm is not used, there may be a disadvantage in that there could be different price ranges resulting in many buyers paying more than other buyers for the same product or service. Thus, by using the price reducer bonus algorithm, all buyers who submitted higher purchase proposals to the lowest bidder will be benefited, because they will have their purchase proposals reduced due to the lowest purchase proposal. In this sense, the present invention teaches that the product or service price is dynamic, more specifically that the prices are dynamic as a function of the interests of offer and demand and generally redefine the market price in the auction.

Thus, the prior art does not mention a system and/or a method for performing sale actions (e.g., actions of an auction) of a product or service where there is an interest of the seller to get a batch of proposals of purchase made by the buyers. This condition, where the sellers dispute the buyers, tends to reduce the price of the goods and services to be sold to the level close to its "real" price, inasmuch as the sellers do know the price each individual buyer might be willing to pay, and the buyers do not know the cost at which the seller might be willing to sell. As a result, a dynamic situation takes place, wherein the effective result of a price reduction attracts more buyers to this market, and since there are more buyers it attracts many other sellers, which results in a more perfect market.

Objectives of the Invention

The present invention has not been developed from the characteristics of the physical environment auctions transposed to the electronic or Internet environment, but rather from the definition of a perfect market, which consists of:

existence of a large number of sellers and buyers, where the individual decision of each will have little influence on the global market;

existence of homogeneity of the product or service, where all the products or services sold by the sellers are equal or similar to each other;

existence of transparency, wherein the participants have full knowledge of the general conditions in which the market operates;

existence of free and broad access to information; and the buyer may present different proposals to sellers.

By making all these points viable and integrated in an optimized way, which is possible mainly due to the advent of the Internet and the use of technology for processing data and making information available, one may define the objectives of the present invention as set forth below.

An objective of the present invention is to provide a system and a method for performing sale actions (e.g., actions of an auction or a sale offer) of a product or service through a communication network with one single seller.

An objective of the present invention is to provide a system and a method for performing sale actions (e.g., actions of an auction or a sale offer) of a product or service in a lot, that receives a lot purchase proposals made by buyers.

Another objective of the present invention is to provide a system and a method for performing sale actions (e.g., actions of an auction or a sale offer) of a product or service, wherein the lot is considered attractive when it comprises a certain amount of proposals made by buyers, said proposals being within the range considered satisfactory to the seller.

An objective of the present invention is to provide a system and a method for performing sale actions (e.g., actions of an auction or a sale offer) of a product or service where the seller and the buyers have the guarantees of carrying out the transaction in conformity with the respective bids made.

An objective of the present invention is to provide a system and a method for performing sale actions (e.g., actions of an auction or sale offer) of a product or service where an administrator of the system may define a bonus factor as a discount (such as a percentage), so as to approximate the value of the highest proposal to the value of the lowest proposal that would be taken by the seller, so that all the buyers will proportionally benefit from the lowest proposal taken by the seller.

An objective of the present invention is to provide a system and a method for performing sale actions (e.g., actions of an auction or sale offer) of a product or service where the guarantees related to the transaction are also presented as offers in the lot by suppliers of service, such as financing and insurance services related to the products being traded.

BRIEF DESCRIPTION OF THE INVENTION

The objectives of the present invention are achieved by means of a method for performing sale actions (e.g., actions of an auction or sale offer) of a product or service through a communication network comprising the following steps:

a seller sends the specifications of the product or service to be put up for sale (e.g., via auction), in a database of the communication network, alongside with a reference price;

receiving from a plurality of buyers a plurality of purchase proposals for the product or service;

storing the plurality of purchase proposals in the database of the communication network;

processing the plurality of purchase proposals and defining a lot, the lot comprising the purchase proposals received by the seller, and monitoring when the seller takes the respective lot, wherein the seller, defines a new lot with an upset price of the seller interest, and commits to sell and to provide said product or service to the plurality of buyers who made the purchase proposals of said lot.

After defining of the lot taken by the seller, recalculate all the purchase proposals by applying a price reducer bonus, wherein the price reducer bonus is previously defined.

The objectives of the present invention are further achieved by means of a system for performing actions regarding selling products or services through a communication network comprising a plurality of buyers, the plurality of buyers and the seller being connected to each other by means of the communication network, the communication network being configured to receive offers of products or services to be put up for auctions from the seller and a plurality of purchase proposals from the plurality of buyers for the offered products or services, the communication network being further configured to store, in a database, the offers of products or services and the plurality of purchase proposals, the communication network processing the plurality of purchase proposals and determining the lot, wherein said lot comprises the plurality of purchase proposals received for the product or service offered, the communication network compiling, in real time so as to group the whole plurality of purchase proposals and the plurality of buyers of the offered product or service for the seller, so the seller may take the respective lot considering a range of purchase proposals that is defined as attractive or acceptable, so that said seller may decide at any time to take or not take the respective lot, the communication network monitoring in real time the taking of the lot by the seller.

BRIEF DESCRIPTION OF THE FIGURES

The present invention will now be described in greater detail with reference to an exemplary embodiment represented in the drawings. The figures show:

FIG. 4 is a demonstration of the bonus system with the simulation of application of different bonus percentages; and FIG. 4A is another table demonstration of the bonus system with the simulation of application of different bonus percentages.

DETAILED DESCRIPTION OF THE INVENTION

Figure 1:
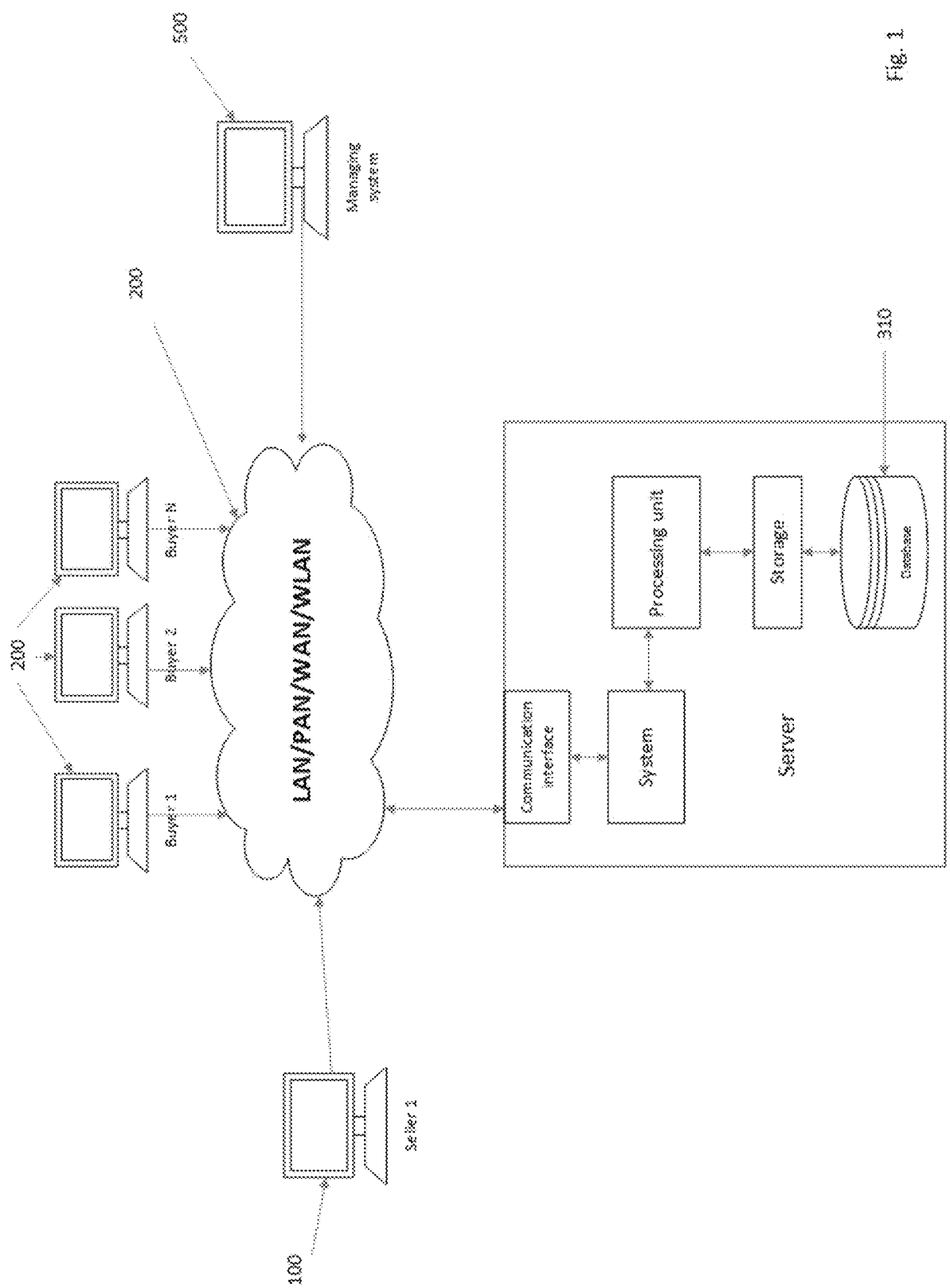
FIG. 1 is a schematic configuration of communication of the system as proposed by the present invention.
Figure 2:
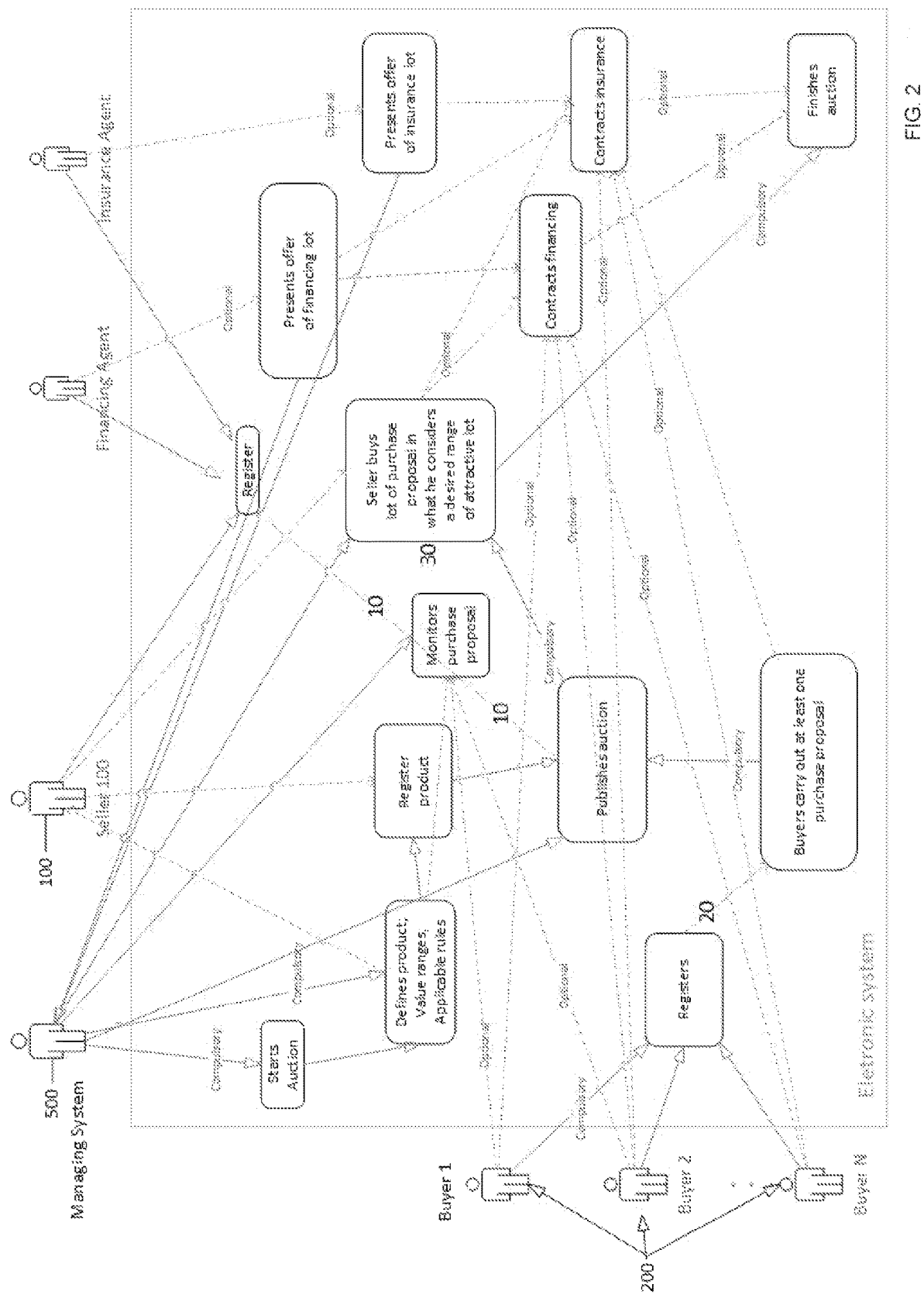
FIG. 2 is a basic structure of simulation of the sale as proposed by the present invention.
Figure 3:
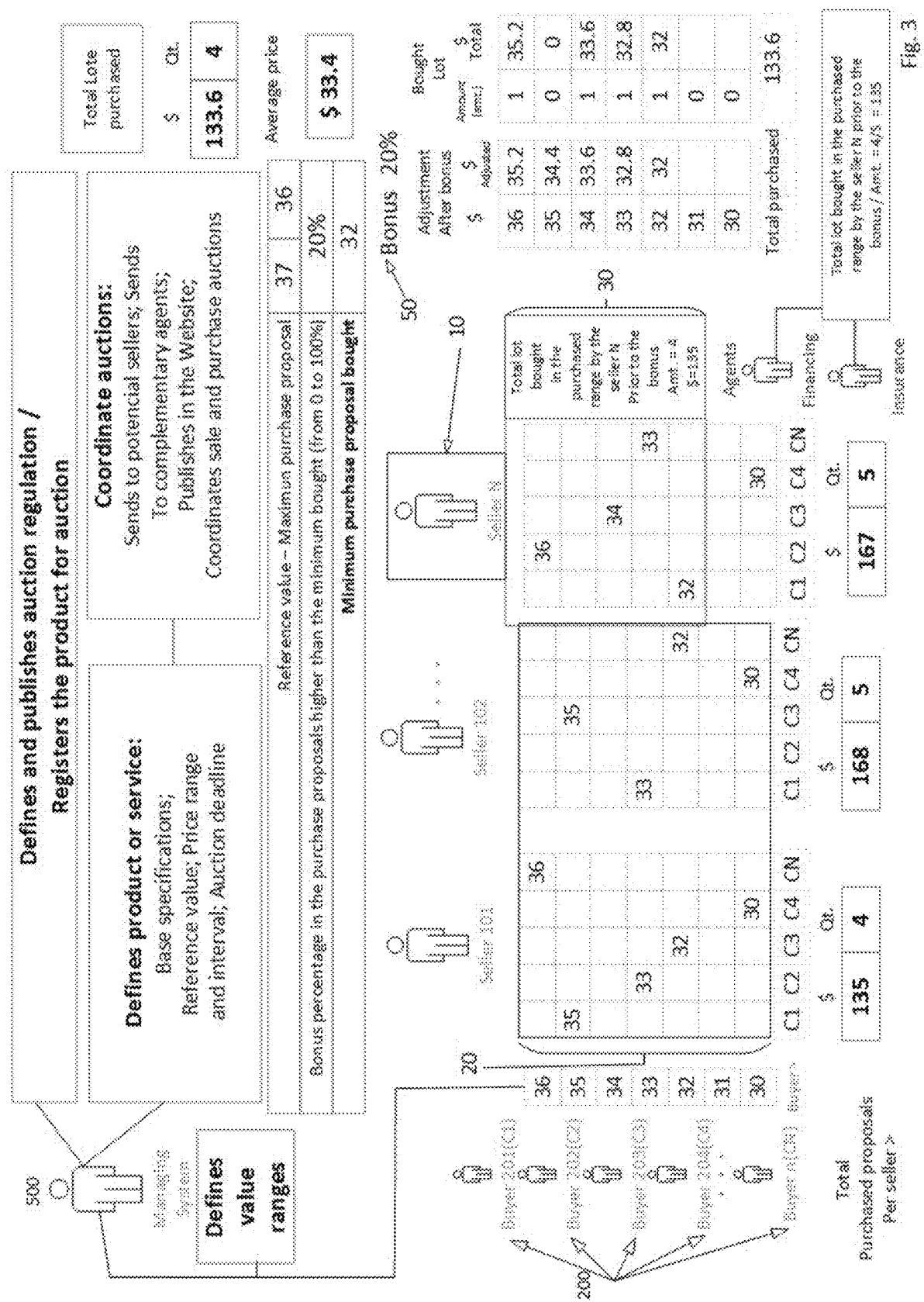
FIG. 3 is a simulation of the sale as proposed by the present invention, wherein the purchase proposals made by the buyers are shown in detail and the simulation of the application of the bonus factor.
Figure 5:
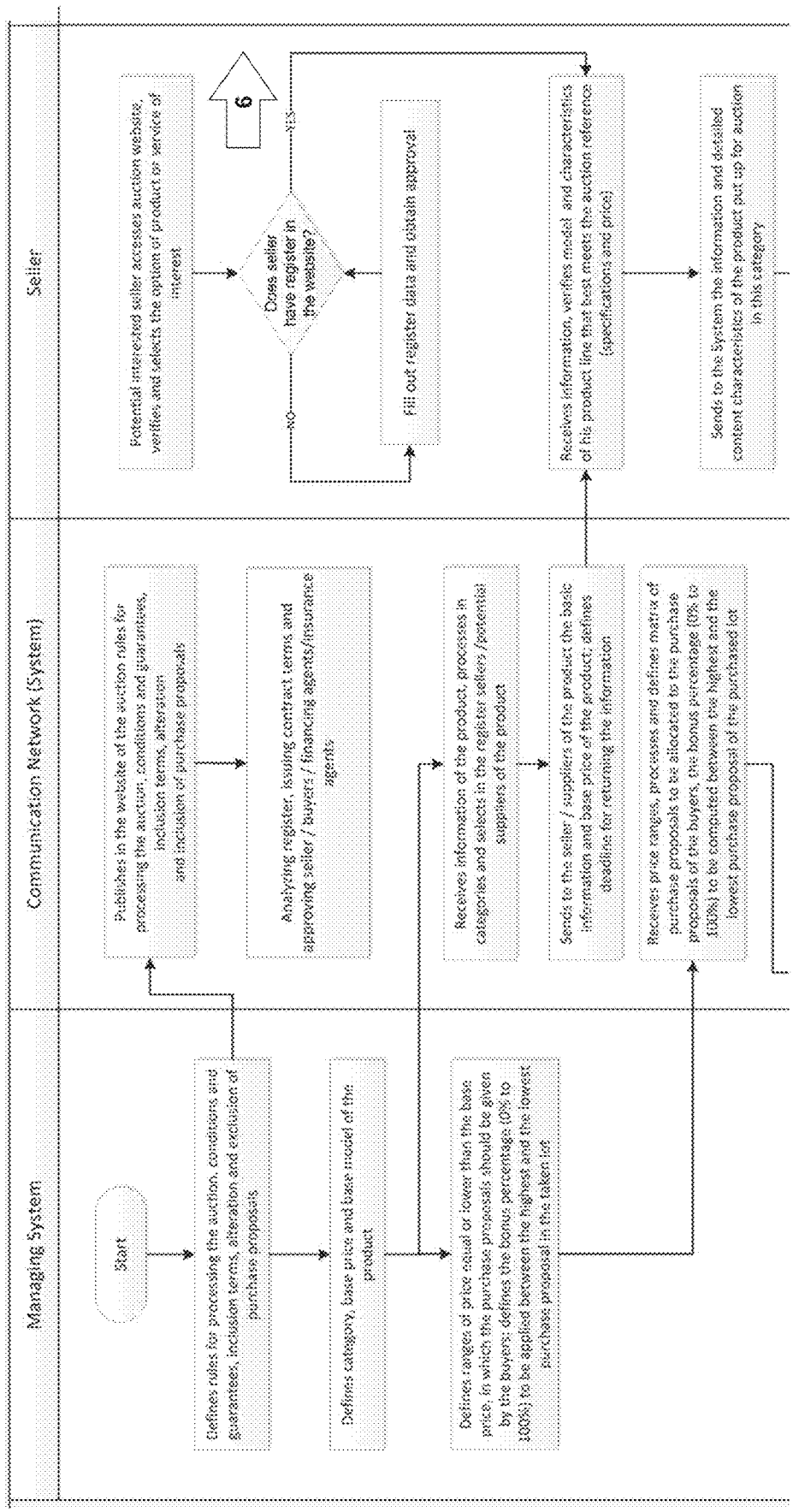
FIGS. 5 to 12 show a detailed multifunctional flowchart of the processing of the sale.
Figure 6:
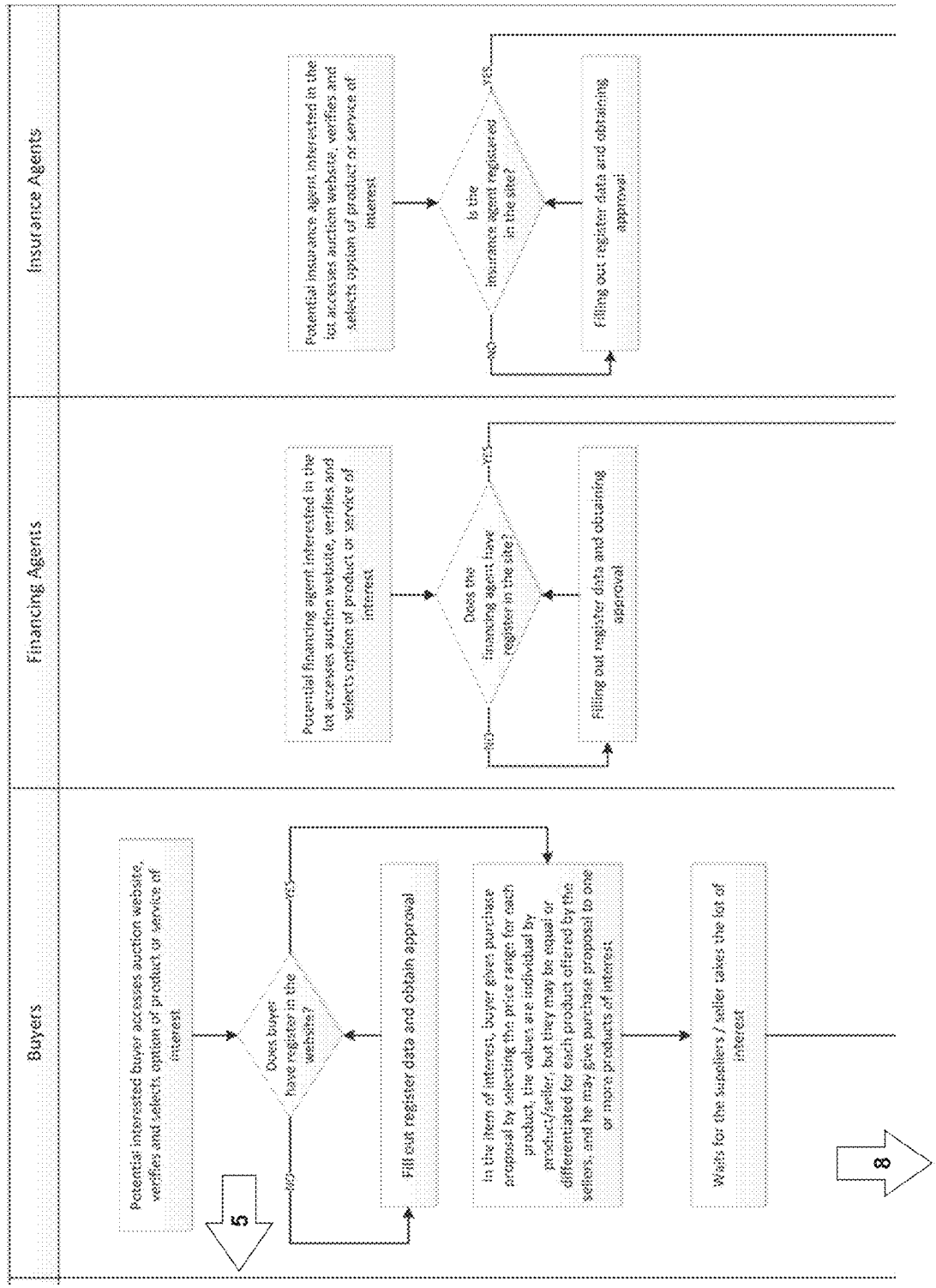
Figure 7:
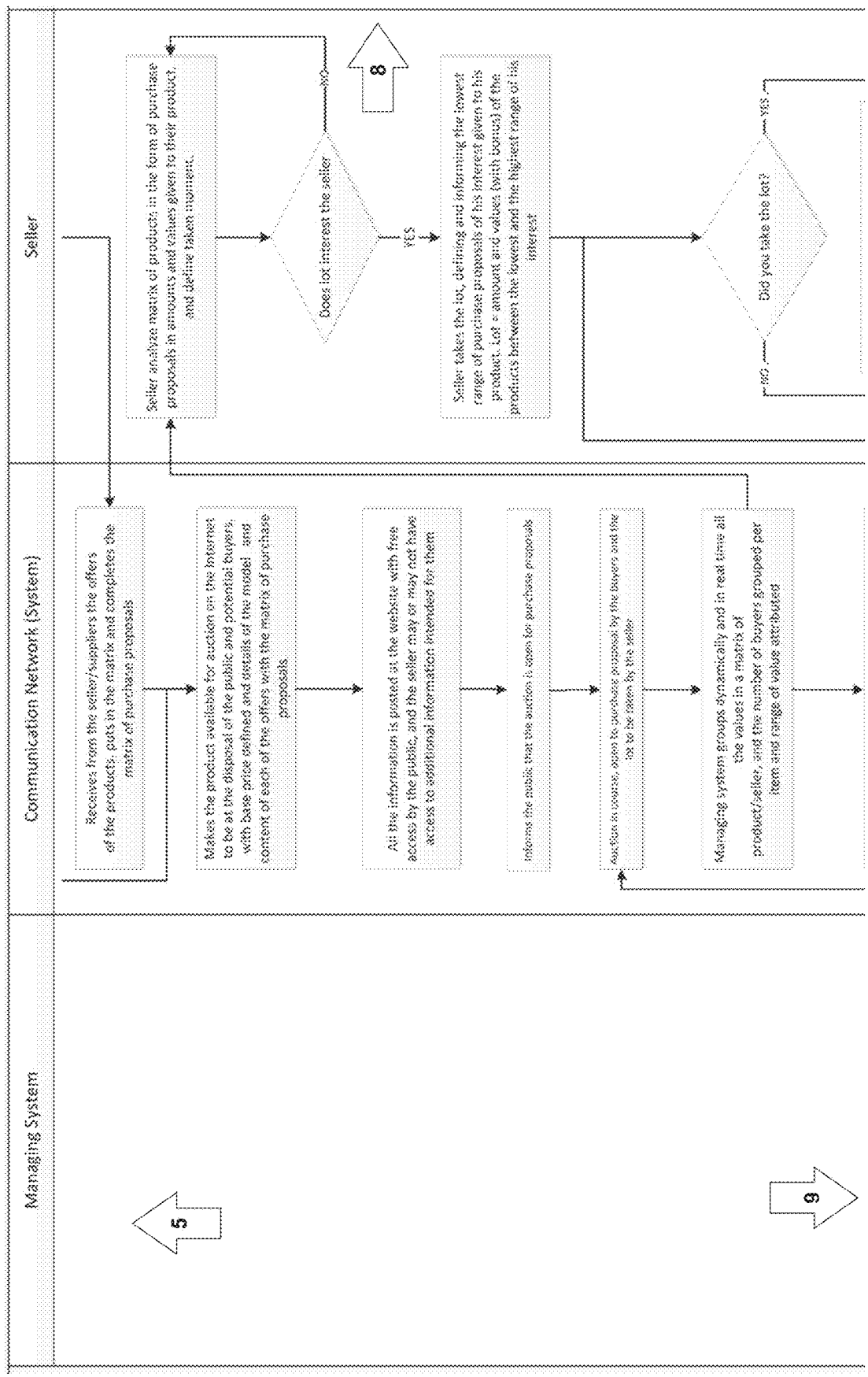
Figure 8:
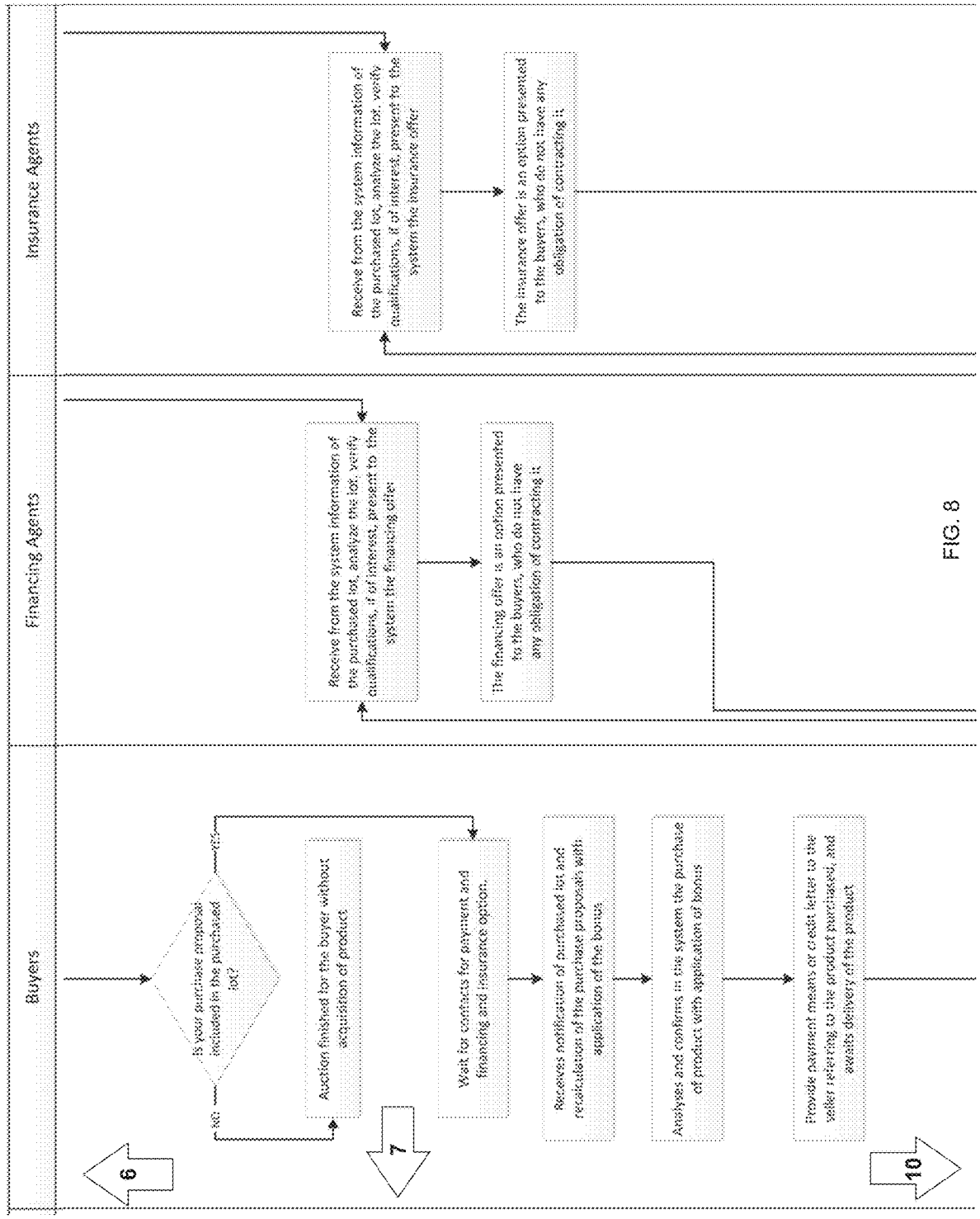
Figure 9:
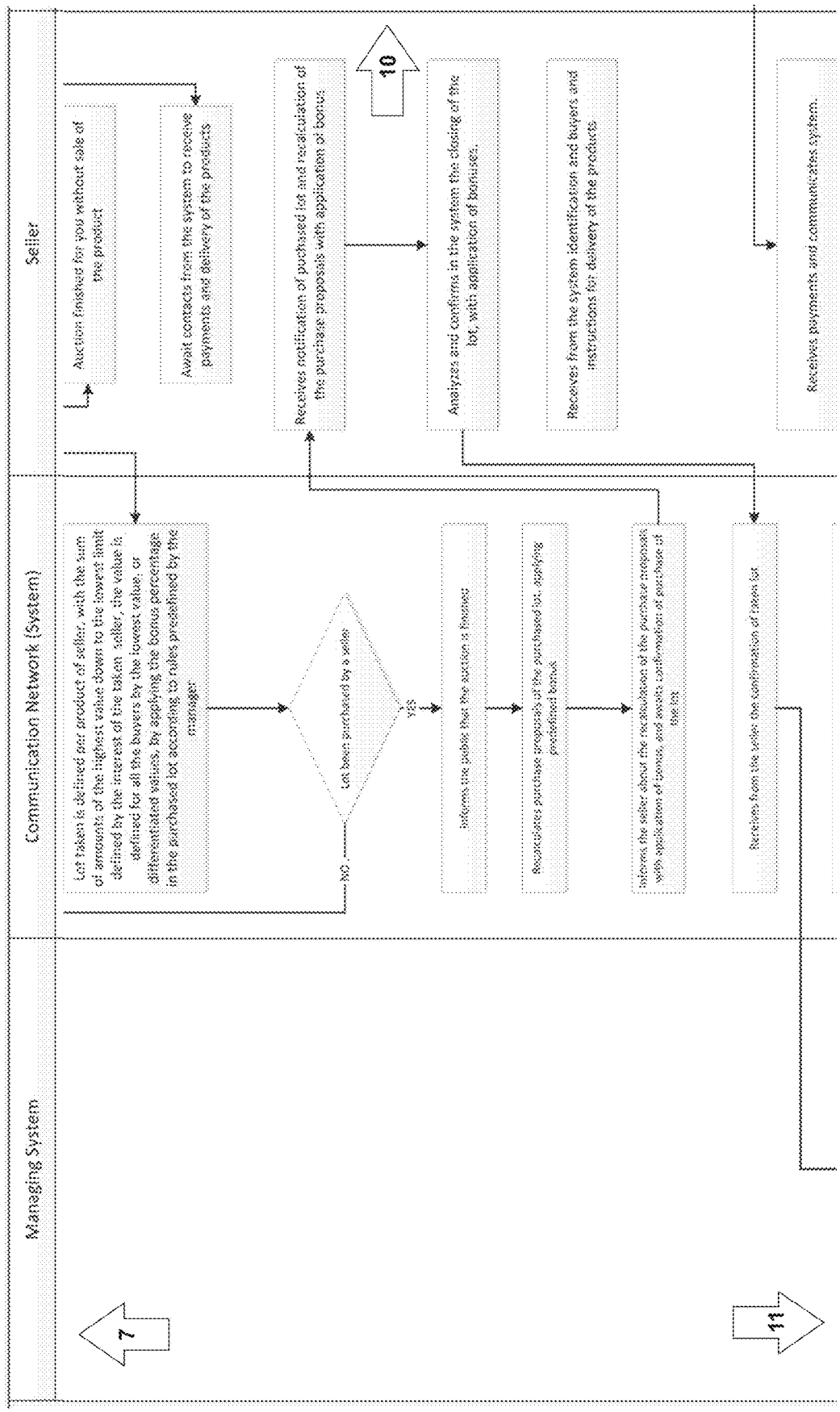
Figure 10:
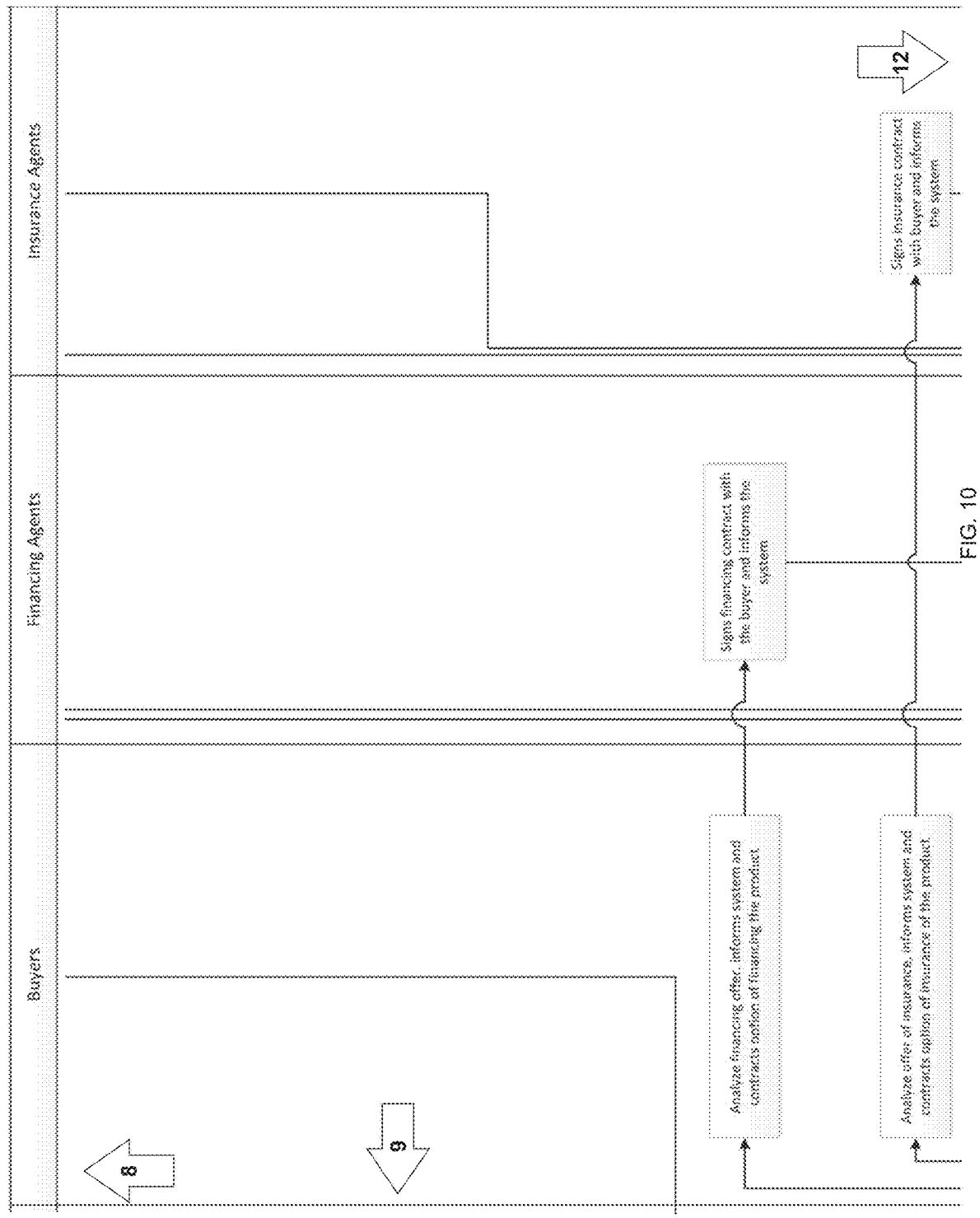
Figure 11:
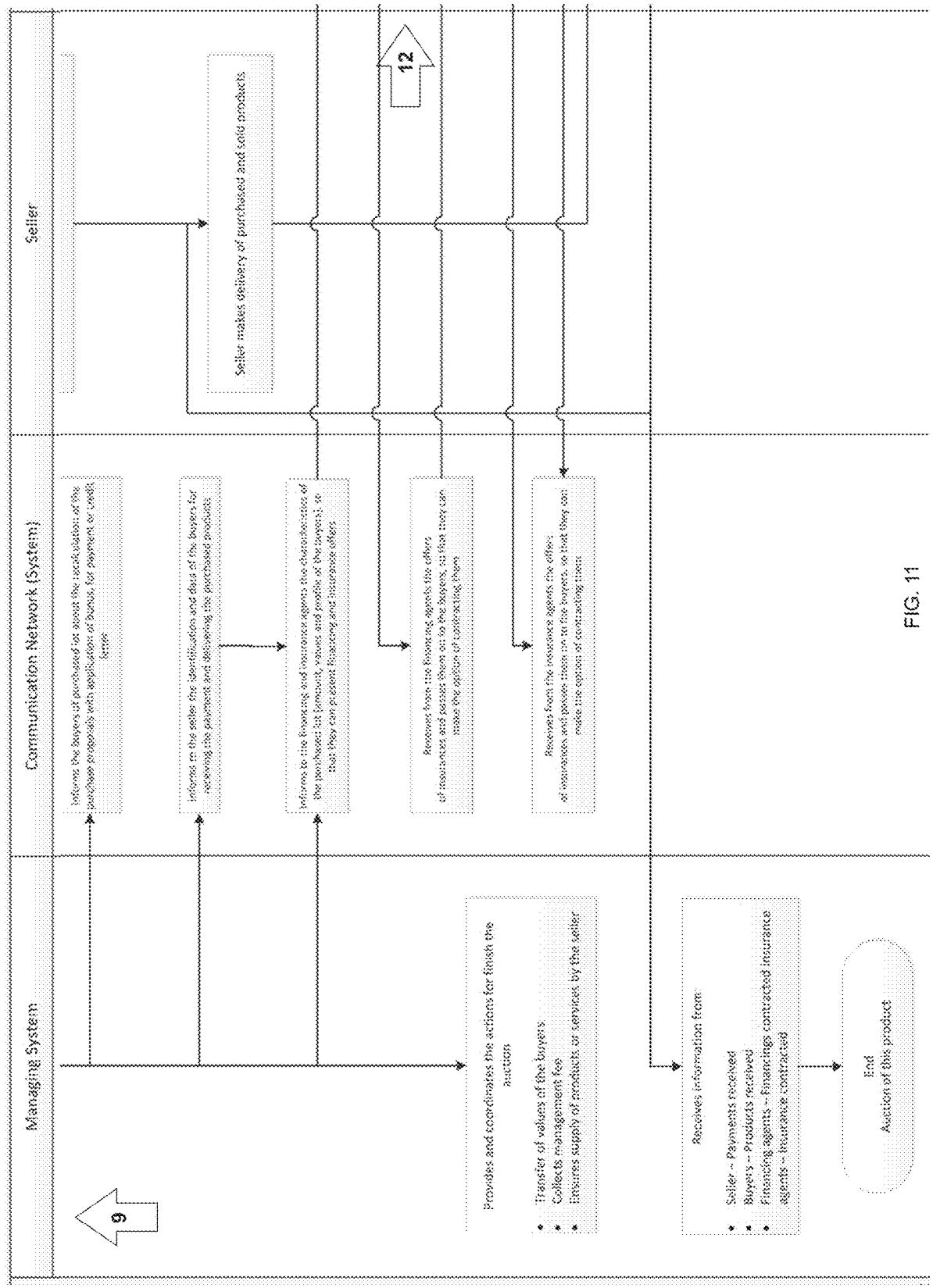
Figure 12:
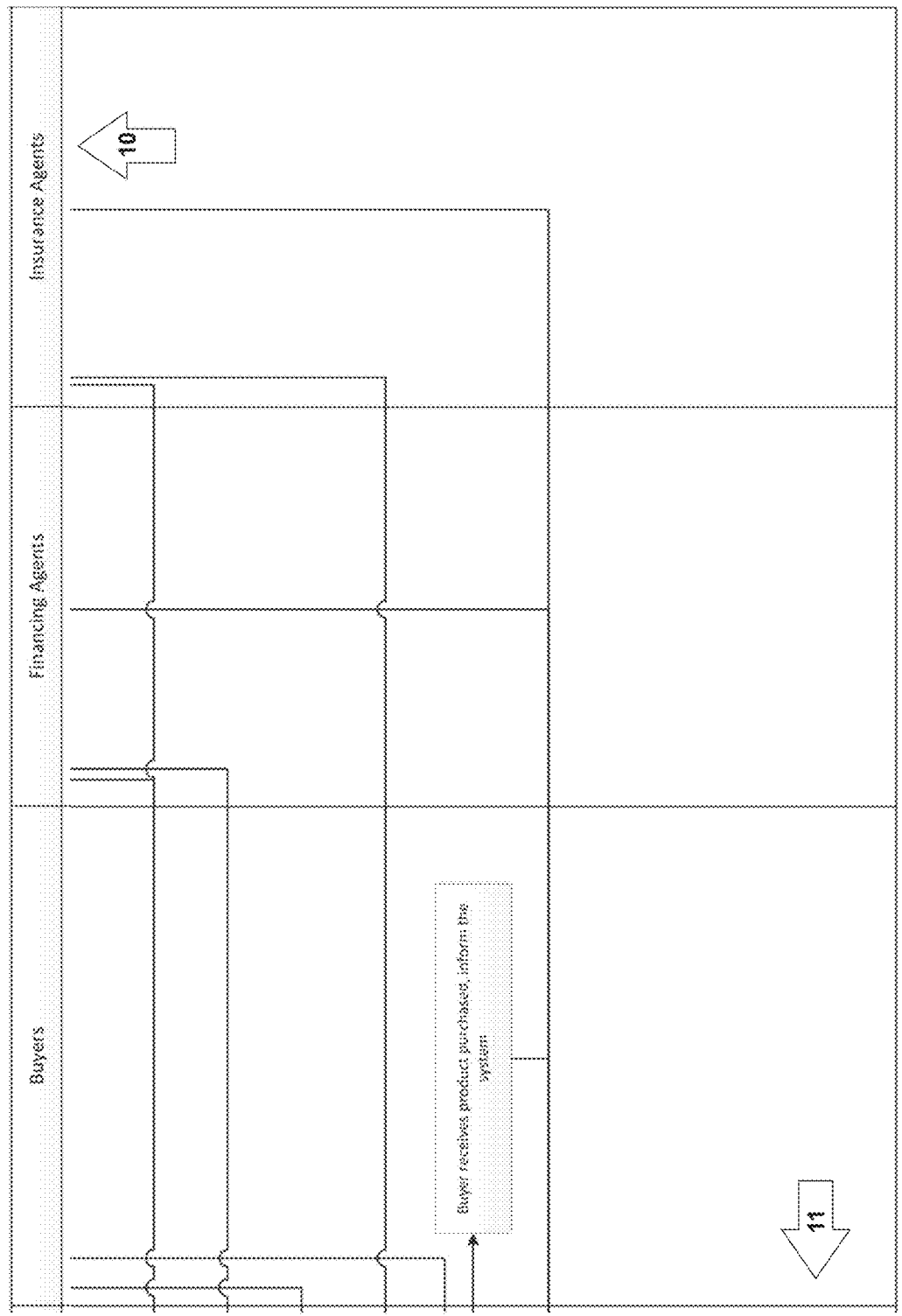

As mentioned, the invention provides a system for performing sale actions (e.g., actions of an auction or sale offer) through a communication network 300, the system comprising a managing system 500, a plurality of buyers 200 and one seller 100, as shown especially in FIG. 3. The method described here for 1 (one) seller, is applicable and works generally the same way for one or more sellers.

The communication network 300 generally comprises a dynamic database 310 and an Internet/Web interface, the database 310 being such as a Hard Disk Drive (HDD), a CD drive, memory cards, non-volatile storage chip (Electrically-Erasable Programmable Read-Only Memory—EEPROM), flash memory, or any other memory device capable of receiving, transmitting and storing data. The communication network 300 also comprises processing circuits for processing the data stored in the database 310.

The communication network 300 is connected to one or more networks, such as a Personal Area Network (PAN), a Local Area Network (LAN), a Metropolitan Area Network (MAN), a Wide-Area Network (WAN), a Wireless Local Area Network (WLAN), among others.

The managing system 500 is connected to the database 310 and to the Internet/Web interface of the communication network 300.

The managing system 500 may be a user able to use a mobile or fixed terminal, such as a personal computer, a tablet, a mobile phone or any other apparatus configured to manage the electronic coordination of the performance of actions of the sale or auction through the communication network 300. In case the managing system 500 is a user, the latter may coordinate the sale or auction by means of a dedicated application.

The managing system 500 may also be autonomous and automatic, for instance, by means of processors, controllers, memories or any other electronic component capable of coordinating the performance of actions of the auction through the communication network 300 such as artificial intelligence, for example.

The plurality of buyers 200 and the seller 100 are connected to the database 310 and to the Internet/Web interface of the communication network 300 by means of a mobile or fixed terminal. The mobile or fixed terminal may be a personal computer, a tablet, a mobile phone or any other device capable of connecting the plurality of buyers 200 and the seller 100 to the communication network 300, for example by means of a dedicated application.

The plurality of buyers 200, the seller 100 and the managing system 500 connected to each other by means of a communication network 300. The plurality of buyers 200 and the seller 100 communicate with the communication network 300 through a wired or wireless network. In one embodiment, any kind of wired or wireless networks using a variety of protocols may be used, such as IEEE 802.11 (Wi-Fi) wireless network, telecommunication networks 2G, 3G, 4G and others (General Packet Radio Service—GPRS/Universal Mobile Telecommunications System—UMTS/Wide Code Division Multiple Access—WCDMA/Long Term Evolution—LTE), Infrared Protocol, Bluetooth® or any other network protocol.

The method and the system for performing sale actions (e.g., actions of an auction or offer) of a product or service through the communication network 300 are initiated when the managing system 500 defines parameters, such as auction processing rules, conditions and guarantees, inclusion terms, alteration and exclusion of proposals/bids, definition of bonus percentage to be applied, among other rules that may be necessary. These may be determined manually by the user connected through the mobile or fixed terminal to the communication network 300 or automatically, by means of artificial intelligence. In case of the latter, the electronic components are capable of collecting, for instance, data from the latest auctions carried out and determine which main rules should be defined in the present auction.

After determining the rules of the sale, the managing system 500 defines a category, a reference price, and the base model of the product or service to be put up for sale. All this information defined by the managing system 500 is sent to the communication network 300 and stored in the database 310.

The communication network 300 then processes the information defined and stored in the database 310. Once the information has been processed, the communication network 300 sends it to the seller 100 and then informs a deadline to return the information.

Once the such information has been received, the seller 100 selects a model and characteristics of the product or service that will better fit the reference of the managing system 500. The seller 100 then sends an offer 10 of product or service, such offer 10 comprising information on the product or service in a suitable category and detailed characteristics of the product or service offered.

It should be noted that different offers 10 for the same initial reference price may be sent by the seller 100.

Said offer 10 is then received by the communication network 300 and stored in the database 310. The offer 10 sent by the seller 100 is stored in the Internet/Web interface for the initial reference price, the information of the offer 10 is then made available for the plurality of buyers 200.

After storing the information in the Internet/Web interface, the managing system 500 publishes (e.g., posts) this information in a website portal, through which the public may have access to all the information of the product or service being offered. The seller 100 may or may not have access to additional (exclusive) information beyond that already provided.

Once the information of the product or service is published, the plurality of buyers 200 may access the website in order to start their participation in the sale.

If any buyer 200 is not registered in the website, they should provide their identification data and obtain an approval from the managing system 500, the latter accounting for the analysis of the registration, issuance of contract terms and to approve or not the seller 100, the plurality of buyers 200, financing agents, insurance agents, potential registered suppliers and others.

Anyhow, all those who have access to the operational contents of the system should be previously registered and approved by the managing system 500 for verification of their qualifications.

If the financing agent considers the plurality of buyers 200 to be of interest, it may be presented an offer of guarantee and financing, the latter having details and values of the financing to be incorporated as an offer to the plurality of buyers 200 together with the lot 30. However, it should be understood that the offer of financing is an option presented to the plurality of buyers 200, as such the financing should not be understood as mandatory for the present invention.

If the insurance agent considers the plurality of buyers 200 to be of interest, it may also be presented an offer of insurance, either individual or in group, the latter having details and values of the insurance to be incorporated as an offer to the plurality of buyers 200 together with the lot 30 to be taken. However, one observes that the offer of insurance is an option presented to the plurality of buyers 200, the latter not having any obligation in hiring said services.

If at least one of the plurality of buyers 200 is registered at the website, one should access it in order to verify and select the product or service of interest, that is, the offer 10 of the seller 100. The plurality of buyers 200 may also make proposals of purchase/bid 20 to the product or service being offered.

The purchase/bid proposals 20, that may represent units of one or more for each buyer proposal, are then stored in the database 310 of the communication network 300, the latter being configured to group the purchase proposals 20 by offer of the seller 100 and by value, to monitor and to process the purchase proposals 20 received.

The managing system 500 then processes and groups, in a dynamic manner and in real time, all the purchase proposals 20 received and determines a product or service matrix for the seller 100 and number units proposed by buyers 200 grouped, either in ranges or individually, by value attributed to each offer to the seller 100.

One observes that, from the product or service matrix, the seller 100 will have a general view of all the purchase proposals 20 for each offer 10. Moreover, the matrix illustrates individually a purchase proposal 20 for the seller 100, the purchase proposal 20 being determined by the communication network 300 and being constituted by units corresponding to the purchase proposals 20 received for each offer 10 for the seller 100.

The plurality of buyers 200 then waits for the seller 100 to accept (or reject) the purchase proposals 20 for his product or service being offered, wherein a new lot 30 is generated when the seller 100 accepts at least one purchase proposal 20, the lot 30 being comprised by at least one purchase proposal 20 accepted by the seller.

The lot 30 is limited by the upset price (lowest price range or unit) which the seller 100 defines as being of interest, in this case considering the purchase proposals 20 between said upset price and the maximum purchase proposals 20 value received for his offer 10.

Since the seller 100 has a global view of all the purchase proposals 20 for his offer 10, the seller 100 can decide the opportune moment or wait for a pre-defined time limit for defining the upset price, which with the highest proposals price defines also the lot 30 with the price and units range of his interest. For the avoidance of confusion, it is to be understood that, in embodiments, seller 100 does not accept a lot but defines that a lot is acceptable to him/her.

The seller 100 then analyzes said lot 30, considering the amount of product or service by values, the latter taking the lot 30 of purchase proposals 20.

Taking a car to be auctioned as an example of an offer 10, the seller 100 may take the lot 30 by criteria of minimum purchase proposals 20, such as US $ 32,000.00 monetary units up to the maximum value given for the offer 10, for instance.

Once the lot 30 has been taken by the seller 100, the managing system 500 communicates to all the participants in the auction, that is, the plurality of buyers 200, that the lot 30 has been taken by the buyer 200.

One observes that the seller 100 that has taken the lot 30 will sell it to the plurality of buyers 200 who made purchase proposals 20 within a range from the upset price (lowest price) up to a highest price, within the criteria of the seller 100 (purchase proposals 20 higher than US $32,000.00 in the car example). The purchase proposals 20 for the product or service by the plurality of buyers 200 below the minimum value of the criteria of the seller 100 (e.g., lower than US $32,000.00 I the car example) shall be disregarded.

As an alternative, after lot 30 has been sold (e.g., auctioned), the managing system 500 may apply a bonus factor 50 such as a discount ranging, for example, from 0% to 100% to the purchases orders of the lot 30 of products or services. Such a variable bonus factor 50 may be previously defined by the managing system 500 and disclosed to all auction participants before the beginning of the auction, said bonus 50 aiming to approximate all purchase proposals 20 to the minimum purchase proposal 20 of the auctioned lot 30. Such approximation is determined by the formula 1 below:

$$(PRmin)+((1-B\%)*(PRL-PRmin))$$

wherein:

PRmin corresponds to the upset price range (lowest price range or unit), defined and accepted by the seller of the plurality of products or services related to the lot 30; B % corresponds to a bonus percentage (bonus factor 50) to be applied to the plurality of purchase proposals of the lot 30, equal or higher than the upset price (lowest price range or unit), defined and accepted by the seller by the calculation, wherein the lowest upset price will be a fixed value, wherein B % may be configured as a reduction factor predetermined before the start of the auction by the managing system 500, and may range from 0% to 100%; and PRL corresponds to the purchase proposals within the highest price range or unit, defined and accepted by the seller of the plurality of purchase proposals 20 in the taken lot 30 to which the bonus factor 50 is applied.

For example, if the managing system 500 determines that the bonus factor 50 should be 0%, one observes that a plurality of buyers 200 will buy the product or service of the lot 30 for their purchase proposal 20.

On the other hand, if the managing system 500 previously determined that the bonus factor should be 100%, one observes that all of the plurality of buyers 200 will buy the product or service of the lot 30 auctioned for the lowest purchase proposal of said lot 30.

In view of the foregoing, one observes that the application of a bonus factor 50 should be understood as a choice of the managing system 500, which regards a "democratization" of taken values, and therefore provides a more fair system, managed according to the analysis and the advisability of the market, so that the application of said bonus factor 50 shall be efficient.

After the lot 30 is auctioned, the managing system 500 may communicate with the financing agents and insurance agents or other suppliers, and inform them about the plurality of buyers interested in their services, and may coordinate actions between the agents or suppliers and the buyers, wherein the actions of financing and insurance and others are optional for the plurality of buyers 200.

After communicating that the lot 30 is sold (e.g., auctioned), the managing system 500 may still be responsible for monitoring a transaction to the plurality of buyers 200 who purchased the product or service of the auctioned lot 30 and shall further receive it.

The managing system 500 may additionally monitor the shipment of the product or service of the seller 100 to the plurality of buyers 200, and may further collect a managing fee.

The seller 100 then ships the sold product or service to be delivered to the buyer, while the plurality of buyers 200 provides the payment for the purchased product or service.

After the steps above have been carried out, the sale for the product or service is finished.

The advantage of using the method and the system set forth above is that one reaches an almost perfect market, where, unlike the "real life" market and known prior art techniques, which have difficulty in bringing together a large number of buyers, the present invention advantageously has the ease of bringing them together.

Considering the preferred exemplary embodiment described, one should understand that the scope of the present invention may comprise other possible variations, being limited only by the features of the claims, which include possible equivalent characteristics.

The invention claimed is:

1. A method for performing sale actions of a product or service through a communication network, comprising the following steps:

connecting a terminal of a seller and terminals of a plurality of buyers with each other by the communication network;

sending, from the communication network to the terminal of the seller, specifications of an auctioned product or service to be auctioned beginning at an initial reference price;

sending, from the terminal of the seller to the communication network, at least one offer, wherein the offer includes a model matching or close to the specifications and the initial reference price of the product or service sent to the terminals of the plurality of buyers, storing the offer in a database of the communication network;

processing the offer previously stored in the database by the communication network;

publishing on an auction website, and sending the offer to the terminals of the plurality of buyers, to be accessed, the specifications and an initial reference price of the product or service to be auctioned;

sending, from the terminals of the plurality of buyers to the communication network, a plurality of purchase proposals for the auctioned product or service, storing the plurality of purchase proposals in the database of the communication network;

processing the purchase proposals previously stored in the database by the communication network;

grouping, by the communication network, two or more of the purchase proposals previously received according to the value attributed to each offer of the seller, wherein said group has a range comprised by a minimum upset price interesting to the seller and a highest price range for the purchase proposals;

generating, by the communication network, a product or service matrix from the data related to the offers and purchase proposals previously processed;

sending, from the communication network to the terminal of the seller the matrix previously generated; and monitoring in real time the terminal of the seller exchanging data with the communication network to take a new lot, wherein the new lot is generated when the seller takes at least two purchase proposals, the lot being comprised by all of the purchase proposals taken by the seller, and wherein said lot has a range comprised by a minimum upset price interesting to the seller and a highest price range for the purchase proposals.

2. The method according to claim 1, wherein the communication network is the Internet, the terminals of the seller and the terminals of the plurality of buyers being a mobile or fixed terminal.

3. A method for performing sale actions of a product or service through a communication network, comprising the following steps:

connecting a terminal of a seller, terminals of a plurality of buyers and a managing system by the communication network;

sending, from the managing system to the terminal of the seller, specifications and an initial reference price for the product or service to be sold;

sending, from the terminals of the seller to the communication network, an offer for the product or services matching the specifications to be sold according to previous specifications, wherein the offer is offered at the initial reference price, storing the offer in a database of the communication network;

processing the offer previously stored in the database by the communication network;

publishing and sending the offer to the terminals of the plurality of buyers;

starting an auction and processing in real time, by the communication network, a plurality of purchase proposals received from each of the terminals of the plurality of buyers, wherein the plurality of purchase proposals respectively includes one or more units per proposal price for the product or service;

listing individually or grouping, by the communication network, the one or more of the units corresponding to the purchase proposals previously received according to the price which each of the buyers of the plurality of buyers undertakes to pay for each respective product or service;

storing the plurality of purchase proposals in the database of the communication network;

processing the purchase proposals previously stored in the database by the communication network;

grouping, by the communication network, two or more of the purchase proposals previously received according to the value attributed to each offer of the seller, wherein said group has a range comprised by a minimum upset price interesting to the seller and a highest price range for the purchase proposals;

generating, by the communication network, a product or service matrix from the data related to the offer and purchase proposals previously processed;

sending, from the communication network to the terminals of the seller, the matrix previously generated, wherein the matrix is dynamic and available online in real time for the system, the buyers, and the sellers; and monitoring, in real time, which terminals of the seller exchanges data with the communication network to take a new lot, wherein the new lot is generated when the seller takes at least two purchase proposals, the lot being comprised by all of the purchase proposals taken by the seller and wherein said lot is determined by the range comprised by a minimum upset price interesting to the seller and a highest price for the purchase proposals.

4. The method according to claim 3, wherein the units corresponding to each of the purchase proposals are inputted directly by the buyer singly or according to ranges predefined in the communication network and according to its monetary value in a corresponding range of value.

5. The method according to claim 4, wherein each terminal of the plurality of buyers sends the plurality of purchase proposals of the product in offer for the database of the communication network.

6. The method according to claim 3, wherein the communication network distributes all the units relating to the purchase proposals in ranges according to its monetary value in a corresponding range of value.

7. The method according to claim 6, wherein the seller may finish off and take a batch of products or services in quantities and price that interest him, at a moment the seller wishes, the respective lot with all the purchase proposals attributed to his product or service.

8. The method according to claim 7, wherein the taken of the respective lot by the seller comprises:

defining the upset (minimum) price which the seller defines and undertakes to accept up to the highest value of the purchase proposal of the plurality of purchase proposals, which includes all items of the purchase proposals with values attributed to their product in this price range.

9. The method according to claim 3, wherein the communication network is the Internet, the terminals of the seller and the terminals of the plurality of buyers being a mobile or fixed terminal.

10. A system for performing sale actions of products or services through a communication network, comprising:

terminals of a plurality of buyers and at least one terminal of a seller, the terminals of the plurality of buyers and the terminal of the seller being connected to each other by the communication network;

the communication network being configured to receive, from the terminals of the seller, an offer for the product or service and a plurality of purchase proposals from the terminals of the plurality of buyers for each offer for the product or service put up for sale, wherein the offer set by the seller, for the product or service include a model matching or close to a specification;

the communication network configured to compile, in real time, so as to list individually or group all the purchase proposals of one or more of units corresponding to the purchase proposals sent by the terminals of the plurality of buyers for the product or service offered by the terminal of the seller according to a price which each of the buyers of the plurality of buyers undertakes to pay for each product or service offered by the seller;

the communication network further being configured to store, in a database, the offer and the plurality of purchase proposals;

the communication network configured to process the offer and the plurality of purchase proposals;

the communication network configured to group two or more of the purchase proposals previously received according to the value attributed to each offer of the seller, wherein said group has a range comprised by a minimum upset price interesting to the seller and a highest price range for the purchase proposals;

the communication network configured to generate a product or service matrix from the processed data related to the offer and purchase proposals; and the communication network configured to send the generated matrix to the terminal of the seller and monitoring, in real time, the terminal of the seller exchanging data with the communication network to take a new lot, wherein the respective lot is generated when the seller takes at least two purchase proposals, the lot being comprised by all of the purchase proposals taken by the seller and wherein said lot is determined by the range comprised by a minimum value interesting to the seller and defined by the seller and the highest value for the purchase proposals.

11. The system according to claim 10, wherein the communication network is configured to process and present in a web site the sale offers of one or more sellers.

12. The system according to claim 10, wherein the communication network is configured to process and compile, by listing or grouping, a plurality of items of the purchase proposals, determining a total of the purchase proposals per price for the seller for the lot.

13. The system according to claim 10, wherein the communication network disregards all the purchase proposals of the plurality of purchase proposals sent by all the terminals of the plurality of buyers who sent the plurality of purchase proposals lower than the lowest price took by the terminal of the seller.

14. The system according to claim 13, wherein the communication network disregards the plurality of purchase proposals sent by the terminals of the plurality of buyers who sent a purchase proposal lower than a minimum purchase proposal in the respective lot took by seller.

15. The system according to claim 10, wherein the plurality of buyers of the respective lot are all those included in the range taken by the seller who took the lot.

16. The system according to claim 15, wherein a plurality of prices of the purchase proposals of the lot taken is adjusted after definition of the lowest value range of the lot taken with a discount previously defined by the managing system.

17. The system according to claim 16, wherein the discount to be applied after the lowest price range of the respective lot has been known, is previously defined and disclosed by the managing system, prior to the start of an auction, to all participants of the auction of the product or service.

18. The system according to claim 17, wherein the discount is defined and disclosed before the auction is calculated by a percentage ranging from 0% (zero percent) to 100% (a hundred percent), at the discretion of the managing system, considering market variables and for better efficiency and performance of the auction.

19. The system according to claim 18, wherein the discount is the result of the calculation: $(PRmin)+((1-B\%)*(PRL-PRmin))$, wherein:

PRmin corresponds to an upset price range or unit, defined and accepted by the seller of the product or service related to the lot;

B % corresponds to a bonus factor to be applied to the purchase proposals of the lot, equal or higher than an upset price, defined and accepted by the seller of the plurality of purchase proposals by the calculation, wherein the lowest upset price will be a fixed value, wherein B % may be configured as a reduction factor predetermined before the start of the auction by the managing system, and may range from 0% to 100%'; and PRL corresponds to the purchase proposals within the highest price defined and accepted by the seller of the plurality of the plurality of purchase proposals in the taken lot to which the bonus factor is applied.

20. The system according to claim 15, wherein terminals of the plurality of buyers who gave the plurality of purchase proposals included in the lot will purchase the product or service from the seller who took the lot.

21. The system according to claim 20, wherein the terminals of the plurality of buyers included in the purchased lot has taken the product or service from the seller who took the lot by the price adjusted with application of a bonus in the plurality of purchase proposals given by the terminals of the respective buyer in the purchased lot.

22. The system according to claim 21, wherein the communication network is the Internet, where the managing system makes available to the terminals of the seller and to the terminals of the plurality of buyers access to the communication network by a mobile or fixed terminal.

23. The system according to claim 22, wherein the managing system discloses to potential registered suppliers of complementary products or services related to the products and services at auction with the respective specifications of the products and services put up for sale by the terminals of the seller.

24. The system according to claim 23, wherein the managing system informs the potential registered suppliers of complementary products and services about an amount of products and services taken, so that they can present proposals to supply such products and services.

25. The system according to claim 24, wherein the managing system, after having received the offer of the potential registered suppliers of the products and services related to the products at auction sends such offers on to the terminals of the plurality of buyers, so that they will contract them since they present advantages relating to a volume of the products and services offered.

26. The system according to claim 25, wherein the plurality of buyers makes an option of contracting or purchasing the complementary products or services, negotiated in lot through notification to the managing system which, in turn, will pass them on to the suppliers of complementary products or services.

27. The system according to claim 24, wherein the potential registered suppliers of products or services are financing agents that offer financing services and that additionally are guarantors of a financing operation.

28. The system according to claim 24, wherein the potential registered suppliers of products or services are insurance agents that provide insurance service and that additionally are guarantors of conditions of use of the product.

29. The system according to claim 24, wherein the potential registered suppliers of products or services may supply or incorporate complementary products to the products or services bought by the plurality of buyers.

30. The system according to claim 24, wherein the suppliers of products or services can supply or incorporate complementary products as accessories.

31. The system according to claim 10, wherein the communication network is the Internet, the terminals of the seller and the terminals of the plurality of buyers being a mobile or fixed terminal.

32. A system for performing sale actions of products or services through a communication network, comprising a managing system, terminals of a plurality of buyers and terminals of a seller, being connected among each other by the communication network,
   the communication network being configured to receive, from the managing system, specifications of a product or service and an initial reference price to be sent to the terminals of the seller,
   the communication network being configured to receive, from the terminals of the seller, offers that are in accordance or close to the specifications and the initial reference price for the product or service sent to the terminals of the plurality of buyers,
   the communication network further being configured to store, in a database, the specifications and the initial reference price for the offer sent by the terminals of the seller,
   the communication network publishing on the Internet and sending the data stored in the database of the communication network referring to the offer sent by the terminals of the seller according or close to the specifications and the initial reference price,
   the communication network further being configured to receive, from the terminals of the plurality of buyers, a plurality of purchase proposals for the purchase of the product or the service, wherein the plurality of purchase proposals respectively include items with one or more proposal for the model,
   the communication network compiling, in real time, so as to listing individually or group all the proposals for one or more units corresponding to the purchase proposals sent by the terminals of the plurality of buyers for each product or service offered by the terminals of the seller according to the price which each of the buyers of the plurality of buyers undertakes to pay for each product or service offered by the seller,
   the communication network further being configured to store, in a database, the offer and the plurality of purchase proposals;
   the communication network processing the offer and the plurality of purchase proposals;
   the communication network grouping two or more of the purchase proposals previously received according to the value attributed to each offer of the seller, wherein said group has a range comprised by a minimum upset price interesting to the seller and a highest price range for the purchase proposals;
   the communication network generating a product or service matrix from the processed data related to the offer and purchase proposals, wherein the matrix is dynamic and available online in real time for the system, the buyers, and the sellers; and
   the communication network sending the matrix to the terminals of the seller and monitoring, in real time, which one of the terminals of the seller exchanging data with the communication network to take a respective lot, wherein the respective lot is generated when the seller takes at least two purchase proposals, the lot being comprised by all of the purchase proposals taken by the seller and wherein said lot is determined by the range comprised by a minimum value interesting to the seller and a highest value for the purchase proposals.

33. The system according to claim 32, wherein the communication network is configured to determine a real price of the plurality of purchase proposals distributed per price and an amount of products or services of the respective lot taken by the seller.

34. A system for performing sale actions of products or services through a communication network, comprising:
   terminals of a plurality of buyers and at least one terminal of a seller, the terminals of the plurality of buyers and the terminal of the seller being connected to the communication network,
   the communication network configured to receive, from the terminal of the seller, an offer for the product or service and a plurality of purchase proposals from the terminals of the plurality of buyers for the offer for the product or service, wherein the offer includes a model matching or close to a specification set by the seller considering an initial reference price, wherein the plurality of purchase proposals respectively includes a quantity of one or more units with a price for the model;
   the communication network configured to compile in real time, so as to list individually or group all the proposals of the plurality of purchase proposals sent by the terminals of the plurality of buyers for the product or service offered by the terminal of the seller according to the price which each of the buyers of the plurality of buyers undertakes to pay for each product or service offered by the seller;
   the communication network configured to store, in a database, the offers and the plurality of purchase proposals; and
   the communication network configured to process the offers and the plurality of purchase proposals,
   the communication network configured to group two or more of the purchase proposals previously received according to the value attributed to each offer of the seller, wherein said group has a range comprised by a minimum upset price interesting to the seller and a highest price range for the purchase proposals; and
   the communication network configured to generate a product or service matrix from the processed data related to the offer and purchase proposals (10, 20) the communication network sending and monitoring, in real time, the terminal of the seller exchanging data with the communication network to take a new lot, wherein the respective lot is generated when the seller takes at least two purchase proposals, the lot being comprised by all of the purchase proposals taken by the seller and wherein said lot is determined by the range comprised by a upset price range interesting to the seller and the highest price range the purchase proposals, wherein the communication network is configured to disregard all the purchase proposals of the plurality of purchase proposals sent by all the terminals of the plurality of buyers who sent the plurality of purchase proposals lower than the lowest price took by one of the terminals of the seller, wherein the communication network is configured to process and compile, listing individually or by grouping, the plurality of purchase proposals, determining a total of the one or more units included in the purchase proposals per nominal or range price for the seller for the taken of the lot, the plurality of buyers of the respective lot being all those included in the range taken by the seller who took the lot, and the plurality of purchase proposals of the prices of the respective lot is adjusted after definition of the lowest price the respective lot taken with a discount (bonus) previously defined by the managing system.

35. The system according to claim 34, wherein the discount (bonus) to be applied after the lowest price of the respective lot has been known is previously defined and disclosed by the managing system, prior to the start of the sale offer, to all participants of the sale offer of the product or service, the discount (bonus) to be applied after the lowest price of the respective lot has been taken and defined by the seller and known, is applied to purchase proposals included in the lot taken by the seller.

36. The system according to claim 35, wherein the discount is the result of a calculation: (PRmin)+((1−B %)*(PRL−PRmin)), wherein:

PRmin corresponds to the upset price, defined and accepted by the seller of a product or service related to the lot.

B % corresponds to a bonus factor to be applied to the purchase proposals of the lot, equal or higher than the upset price, defined and accepted by the seller of the plurality of purchase proposals by the calculation, wherein the lowest upset price will be a fixed value, wherein B % may be configured as a reduction factor predetermined before the start of the sale offer by the managing system, and may range from 0% to 100%, so as by the calculation, the smallest purchase proposal of the lot remains at the same value; and PRL corresponds to the purchase proposals within the highest price defined and accepted by the seller of the plurality of purchase proposals in the taken lot to which the bonus factor is applied.

37. The system according to claim 34, wherein the discount defined and disclosed before an auction is calculated by a percentage ranging from 0% to 100%, at the discretion of the managing system, considering market variables and for better efficiency and performance of the auction.

* * * * *